Oct. 30, 1956  D. D. PEEBLES ET AL  2,768,912
SEPARATION OF CRYSTALLIZED LACTOSE FROM WHEY SOLIDS
Filed March 10, 1952
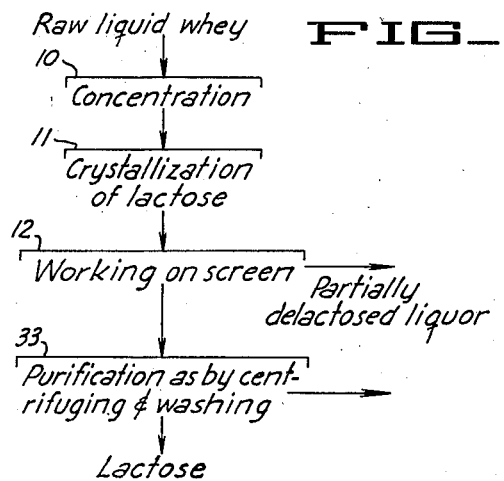
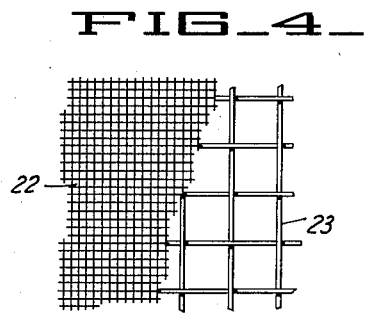
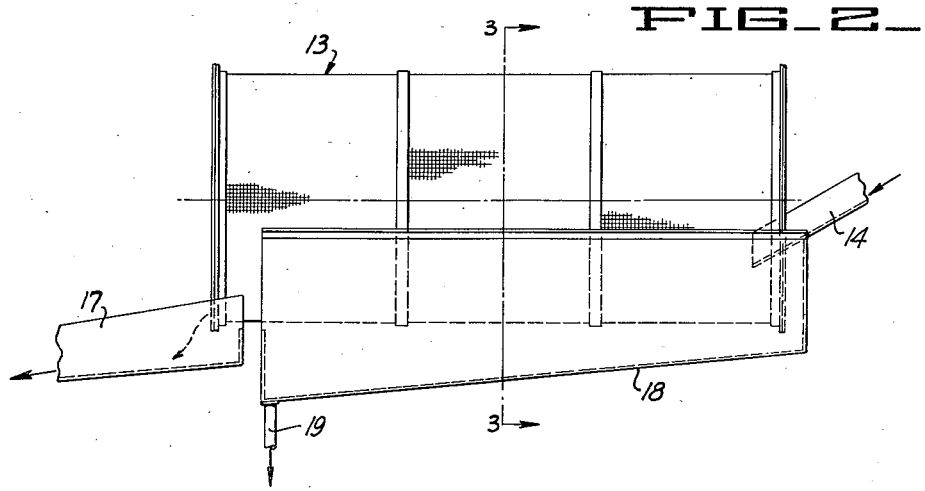
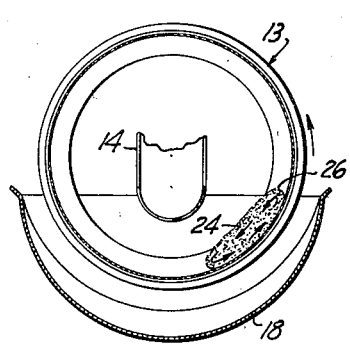
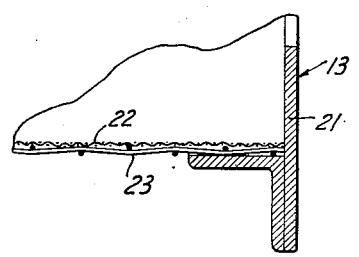
INVENTORS
DAVID D. PEEBLES
PAUL D. CLARY, JR.
BY
ATTORNEYS

United States Patent Office 2,768,912
Patented Oct. 30, 1956

2,768,912

SEPARATION OF CRYSTALLIZED LACTOSE FROM WHEY SOLIDS

David D. Peebles, Davis, and Paul D. Clary, Jr., Petaluma, Calif., assignors to Western Condensing Company, San Francisco, Calif., a corporation of California Application March 10, 1952, Serial No. 275,744

2 Claims. (Cl. 127—31)

This invention relates generally to processes for the manufacture of milk sugar or lactose from liquid whey.

A number of commercial processes have been developed for the manufacture of lactose from liquid whey. In one such process a portion of the protein of the whey is coagulated by addition of lime and application of heat, after which the coagulated solids together with precipitated calcium phosphate and other insoluble solids are removed by decantation, filtration, or centrifuging. The clarified effluent is then concentrated by evaporation, and lactose is crystallized from the concentrate. Crystallized lactose is then removed from the mother liquor as by centrifuging, and further purified by washing. Processes of this character have many undesirable characteristics, including particularly the fact that nutritive constituents of the whey solids, other than the recovered lactose, are seriously impaired or destroyed.

Another process, which has proven to be commercially successful, is disclosed in Patent 2,439,612. In that process liquid whey is concentrated by vacuum evaporation, and a substantial part of the lactose content permitted to crystallize. The resulting slurry is diluted with cool water and submitted to hydraulic separation. The lactose crystals recovered by hydraulic separation can be further purified by centrifuging, washing, etc. The effluent can be treated to produce a dry powdered product having substantially all of the nutritive ingredients of the original whey, except for the removed lactose content. The commercial process thus described is likewise subject to certain disadvantages. Particularly it requires considerable fresh water for diluting the whey after crystallization, and assuming that the overflow from the hydraulic separating operation is to be spray dried to form a powdered product, all of the added water must subsequently be removed by evaporation.

The process of our Patent 2,439,612 is also relatively critical with respect to the crystallizing operation. Unless crystallization is carefully controlled a considerable percentage of the crystallized lactose may be in the form of crystals which are relatively small in size, and which are either redissolved or discharged in the overflow from the hydraulic separating operation. Thus the over-all yield of lactose tends to vary with changes in the crystallizing operation, and it is difficult to maintain a constant yield for successive batches of material.

It is an object of the present invention to provide a new process for the manufacture of lactose from liquid whey which will require a minimum of fresh water in effecting primary separation of crystallized lactose from other whey solids.

Another object of the invention is to provide an improved process of the above character which will facilitate removal of a relatively high percentage of the available lactose of the whey, and which will not be highly critical with respect to control of the crystallizing operation.

Another object of the invention is to provide a process of the above character which is more economical than prior processes and which can be carried out by the use of relatively simple equipment.

Additional objects and features of the invention will appear from the following description in which the preferred embodiment of the invention has been set forth in detail in conjunction with the accompanying drawing.

Referring to the drawing:

Figure 1 is a simple flow sheet illustrating the various steps in carrying out the present process.

Figure 2 is a schematic side-elevational view of screening equipment which can be used for the primary separating operation.

Figure 3 is a schematic view illustrating how a mass of material is subjected to continuous working on a screen for the effective primary separation of lactose crystals.

Figure 4 is an enlarged detail illustrating a suitable type of screening medium which can be used.

Figure 5 is an enlarged cross-sectional detail showing the inlet end of the screening reel.

In carrying out the present process raw liquid whey is concentrated as by vacuum evaporation to produce a concentrate which is supersaturated with respect to its lactose content. A substantial part of the lactose is then permitted to crystallize out, either with or without seeding, to produce a mixture of slurry-like consistency. This material is treated in a suitable screening apparatus that serves to maintain a working mass of material undergoing treatment, as will be presently explained. Effluent removed from the screening operation can be spray dried or otherwise treated to form marketable products. The lactose removed in the screening operation can be further purified as by centrifuging and washing, filtration, recrystallization, etc., to produce a marketable lactose having the purity desired.

The procedure illustrated in Figure 1 is as follows: A suitable raw liquid whey, such as either cheese or casein whey, or a mixture of the two, is concentrated at 10 as by vacuum evaporation. The whey concentrate obtained may for example contain from 40 to 55% solids. The extent of concentration depends somewhat upon the type of evaporating equipment employed, and the lactose yield desired from the process.

The concentrate obtained as described above is then subjected to the crystallizing operation 11. This can be carried out in suitable crystallizing tanks where the material is permitted to remain for a period of time sufficient to permit development of lactose crystals. During crystallizing, gentle agitation is desirable, and it is also desirable, but not essential, to subject the material to gradual cooling. In a typical instance the concentrate may be received in the crystallizing tanks at a temperature of about 110° F., and during crystallization it may cool gradually to a temperature of the order of 68° F.

If desired, seeding may be practiced in the crystallizing operation. Thus at the end of the crystallizing operation, only a part of the batch of material which has been crystallized can be removed, leaving the remainder to intermix with and seed a succeeding batch of concentrate. Also it is possible to use progressive seeding of concentrate as described in Patent 2,439,612.

At the end of the crystallizing operation the material contains lactose crystals which vary considerably as to size. A considerable number of such crystals are of such size that they will not pass through an 80 mesh screen, although a substantial amount of the lactose is in the form of finer crystals. The specific size distribution of the crystals is dependent upon a number of factors, including the extent of concentration prior to crystallization, and the manner in which crystallization is controlled.

The next step 12 of the process is to work the crystallized material on a screen. For this purpose we can use simple screening equipment of the type illustrated schematically in Figures 2, 3 and 4. This equipment consists of a rotary screening drum or reel 13, which has provision at its one end to receive feed material, as indicated by pipe or launder 14, and which has provision at its other end for the discharge of moist lactose crystals, as indicated by the launder 17. Suitable effluent collecting means such as the collecting pan 18 and the drain pipe 19, can be provided for removing the liquid material passing through the screen. The screening reel 13 can be mounted upon a generally horizontal axis as illustrated in Figure 2, although it may be more or less inclined to the horizontal, depending upon various factors such as speed of rotation, rate of feed, etc. The feed end of the screen can be provided with a curb or flange 21 (Figure 5) which aids in retaining the liquid feed, and in causing a progression of the material through the drum.

The screening area of the reel 13 is shown including a fine wire mesh 22, which is backed by a relatively coarse supporting screen 23. By way of example, the screen 22 may range from 60 to 80 mesh, to provide screen openings ranging from .0092 to .0070 inch square.

When the apparatus described above is in operation, and crystallized whey concentrate is being supplied continuously to the screening drum 13, a novel method is carried out which makes possible effective separation of lactose crystals. As illustrated in Figure 3, a mass 24 of considerable depth is maintained on the screen, and this mass is subjected to continuous working. By working we have reference to the fact that the mass is continuously rolling over upon itself, as indicated by the arrows in Figure 3. This working mass commences to form near the feed end of the reel and extends to the discharge end. It remains below the level of the center of the reel on the upmoving side. The mass is of increasing viscosity from the feed end toward the discharge end of the drum, due to the progressive elimination of effluent.

The working mass described above plays an important part in effectively removing lactose crystals. The mass retains within itself not only the relatively coarse crystals which are too large to pass through the screen, but also a very substantial percentage of finer crystals which would normally be expected to pass through such a screen. Continuous working of the mass causes progressive extruding of liquor through the meshes of the screen and such discharge occurs through the entire length of the reel. The mass becomes progressively more viscous toward the discharge end, which is attributed to the progressive increase in content of lactose crystals. Where the working mass pulls away from contact with the screen, as indicated at 26 in Figure 3, there is a continuous pulling away action which tends to clear the meshes of the fine screen 22, thus preventing clogging such as would interfere with proper screening action. This pulling away action for clearing the openings in the fine screen is made possible by the fact that the working mass has a marked surface stickiness, due to the non-lactose whey solids present.

The viscous mass discharging from the screening reel 13 consists mainly of crystallized lactose, and may for example contain from 65 to 70% lactose crystals and from about 66 to 72% total solids. As indicated in the flow sheet of Figure 1, this material can then be subjected to purification at 33, as by centrifuging and washing. Centrifuging can be carried out by conventional centrifuges of the basket type, and the centrifuge cake before its discharge, can be washed with fresh water. After such treatment the lactose can be dried to form a marketable product. Such a product may for example contain from 99 to 99.5% lactose (monohydrate). Purer products can be prepared by conventional purification methods, such as further washing, resolution and re-crystallization.

By way of example, the process was in one instance operated as follows: The whey employed contained about 6.05% solids, and the solids analyzed as follows:

| | Percent |
|---|---|
| Acid (as lactic) | 5.6 |
| Lactose (monohydrate) | 67.3 |
| Protein | 14.0 |
| Ash | 10.0 |
| Undetermined | 3.1 |

They whey was concentrated by vacuum evaporation to produce a concentrate containing 48.3% solids. This concentrate was subjected to crystallization whereby of the total lactose content, about 63.4% was crystallized, and the remainder left in solution. An analysis of the crystals showed that about 82.0% were too large to pass through an 80 mesh screen, having screen openings measuring .0070 inch square.

The above crystallized material, without dilution, and at room temperature (about 70° F.) was fed to a reel of the type previously described, making use of an 80 mesh screen 22. The reel was 24 inches in diameter and was rotated at 11.6 R. P. M. to give a peripheral velocity of 73 feet per minute. The effective retention period of the working mass in progressing through the reel was about 4 minutes. Of the total feed, 74% passed through the screen and was removed as a liquor through pipe 19, and 26% was discharged from the end of the reel as a paste-like lactose slurry.

The latter material contained 72.0% solids, 69.4% of which was crystallized lactose (monohydrate). This material was treated in a basket type centrifuge, with washing of the centrifuge cake, and was then dried to provide a material containing 99.4% total solids and 97.7% lactose (monohydrate). The effluent from the reel contained 40.0% solids and 19.5% lactose.

As previously stated, the degree of concentration prior to crystallization may vary in accordance with the equipment employed, and the general requirements of the process. In general it is possible to increase the lactose recovery by employing higher concentrations. In commercial operations where the effluent recovered from the screening operation is spray dried and sold as a powdered feed material, it is desirable to maintain the percentage of lactose recovery substantially constant. This enables manufacture of a powdered residue with a fixed amount of residual lactose. Our process makes possible manufacture of lactose to a substantially constant percentage yield without close and sensitive control of various factors of the process, including particularly the manner in which the crystallizing operation is controlled. Thus minor deviations in crystal size such as are experienced in commercial crystallizing operations do not materially affect the over-all yield.

The speed of rotation of the reel should be such as to provide the desired working mass of material. If too high a speed is employed (e. g. peripheral speeds of the order of 80 R. P. M. or more) the material tends to rotate with the screen, thus preventing the desired action.

In the foregoing example it will be noted that a substantial percentage of the crystals recovered in the screening operation are crystals of a size which would normally be expected to pass through an 80 mesh screen. As previously explained this feature of the process is attributed to the peculiar conditions within the working mass on the screen, whereby a substantial percentage of small size crystals are held within the mass rather than to pass through the meshes of the screen with the effluent.

Because of the absence of fresh water dilution the effluent can be readily treated as by ordinary spray drying, to convert the same to a saleable powdered product. The amount of fresh water which may be used in connection with centrifuging is relatively small, and the effluent from such washing may, if desired, be merged with effluent from the screening operation, for spray drying.

We claim:

1. In a process for the manufacture of lactose from whey, subjecting liquid whey to evaporation to form a concentrate which is supersaturated with respect to its lactose content, subjecting the concentrate to crystallization whereby a substantial percentage of the lactose content is crystallized, continuously feeding material from the crystallizing operation into a screen reel adjacent one end thereof with continuous rotation of the reel whereby the material within the reel forms and maintains a working mass which extends from the feed end to the other discharge end of the reel, said working mass being unconfined with respect to its two side and upper surfaces and continuously rolling over upon itself as the reel rotates, the rate of rotation being sufficient to force the mass to roll over on itself, but below the rate at which the mass rotates with the reel effluent being continuously extruded from the working mass through the screen and the mass becoming progressively more viscous toward the discharge end of the reel, and continuously removing material from the discharge end of the reel, said last named material being paste-like and comprising largely lactose crystals.

2. A process as in claim in which the concentrate immediately prior to crystallization contains from about 40 to 55% solids, and in which the material being discharged contains from about 65 to 70% lactose crystals.

References Cited in the file of this patent

UNITED STATES PATENTS

| | | |
|---|---|---|
| 696,217 | Weinrich | Mar. 25, 1902 |
| 712,391 | Langlois | Oct. 8, 1902 |
| 1,066,397 | Fromm et al. | July 1, 1913 |
| 1,217,705 | Clairain et al. | Feb. 27, 1917 |
| 2,439,612 | Peebles et al. | Apr. 13, 1948 |